(12) United States Patent
Kato

(10) Patent No.: US 6,846,247 B2
(45) Date of Patent: Jan. 25, 2005

(54) THREAD WOUND GOLF BALL

(75) Inventor: Akira Kato, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 113 days.

(21) Appl. No.: 09/450,649

(22) Filed: Nov. 30, 1999

(65) Prior Publication Data

US 2002/0058552 A1 May 16, 2002

(30) Foreign Application Priority Data

Nov. 30, 1998  (JP) ............................................ 10-339077

(51) Int. Cl.$^7$ ............................................. A63B 37/06
(52) U.S. Cl. ...................................................... 473/363
(58) Field of Search .................................. 473/356–366

(56) References Cited

U.S. PATENT DOCUMENTS 5,542,663 A * 8/1996 Kato et al. .................. 473/363
5,716,293 A * 2/1998 Yabuki et al. ............... 473/363
5,849,392 A   12/1998 Hamada et al.

* cited by examiner

*Primary Examiner*—Raeann Gorden
(74) *Attorney, Agent, or Firm*—Birch, Stewart, Kolasch & Birch, LLP

(57) ABSTRACT

The present invention provides a thread wound golf ball having long flight distance, and having large spin amount and good controllability at approach shot when hitting by a short iron club and the like, while maintaining soft and good shot feel at the time of hitting as good as the conventional liquid center type thread wound golf balls. The present invention related to a thread wound golf ball comprising (a) a solid center composed of an inner center formed from a vulcanized molded rubber composition containing an oily substance, and a center outer layer formed from an oil-resistant substance and coated around the inner center so as to prevent the oily substance of the inner center from bleeding, (b) a thread rubber layer formed on the solid center, and (c) a cover covering the thread rubber layer, wherein the inner center has a diameter of 24 to 33 mm, a JIS-A hardness of not more than 50 and a deformation amount of not less than 2.0 mm when applying from an initial load of 1 kg to a final load of 5 kg, the center outer layer has a Shore D hardness of not more than 60 and is formed from a resin composition mainly containing thermoplastic resin, and the solid center has a diameter of 25 to 34 mm.

4 Claims, 1 Drawing Sheet

THREAD WOUND GOLF BALL

FIELD OF THE INVENTION

The present invention relates to a thread wound golf ball. More particularly, it relates to a thread wound golf ball having long flight distance, and having large spin amount and good controllability at approach shot when hitting by a short iron club and the like, while maintaining soft and good shot feel at the time of hitting as good as the conventional liquid center type thread wound golf balls.

BACKGROUND OF THE INVENTION

Many golf balls are commercially selling, but they are typically classified into solid golf balls such as two-piece golf ball, three-piece golf ball and the like, and thread wound golf balls. The solid golf ball consists of a solid core of molded rubber material and a cover of thermoplastic resin (e.g. ionomer resin) covering on the solid core. The thread wound golf ball consists of a solid or liquid center, a thread wound layer formed on the center and a cover of ionomer resin or balata etc. having a thickness of 1 to 2 mm covering on the thread wound layer.

The thread wound golf ball, when compared with the solid golf ball, has better shot feel at the time of hitting and better controllability at approach shot. The thread wound golf ball is generally approved of or employed by high level golfers, especially professional golfers, who regard the characteristics as most important. On the other hand, the thread wound golf ball is inferior in flight distance to the solid golf ball. Therefore, it is required to provide the thread wound golf ball having sufficient flight distance, while maintaining the advantage of having good shot feel and excellent controllability.

In the thread wound golf balls, there are two types, such as one comprising a solid center formed from integrally molded rubber material and the other comprising a liquid center composed of a hollow rubber sphere and liquid encapsulated in the sphere. The thread wound golf ball consists of the solid or liquid center, a thread wound layer formed on the center and a cover of ionomer resin or balata etc. covering on the thread wound layer. The conventional solid center of rubber material, which is formed from vulcanized butadiene rubber, has very high hardness and small compression strain. The thread wound golf ball comprising the solid center has the disadvantage of having short flight distance, because the spin amount is large and the launch angle is small. The hit golf ball curves too much to control easily, sometimes.

On the other hand, the liquid center has large compression strain. The thread wound golf ball comprising the liquid center, when compared with the thread wound golf ball comprising the solid center, has the advantage of having long flight distance, because the spin amount is small and the launch angle is large. In the case of the liquid center, the production process is more complicated than that of the solid center. If the golf ball is cut by a cutter and the like, the liquid in the liquid center is scattered around. If the liquid comes into eyes, one would unfortunately lose one's eyesight.

The present inventors have found that the spin amount is restrained low and the launch angle is high to extend the flight distance together when hit by a wood club and an iron club, while maintaining proper initial velocity, by employing a solid rubber having a crosslinked structure containing an oily substance as a center of thread wound golf ball (Japanese Patent Kokai Publication No. 337217/1993). However, the oily substance of the center causes bleeding with time to penetrate into the thread rubber layer, which results in deterioration of rebound characteristics. Therefore there was a problem that the performances of the resulting golf ball could not be maintained.

The present inventors have found that the performances of the resulting golf ball can be maintained, by coating around the solid rubber center containing an oily substance with an oily-resistant substance to prevent the bleeding of the oily substance (Japanese Patent No. 2664857, Japanese Patent Kokai Publication No. 173504/1997). However, since an oily-resistant rubber or ionomer resin having high hardness are employed as an oily-resistant substance for coating around the solid rubber center containing an oily substance, it is required to improve the rebound characteristics and shot feel.

OBJECTS OF THE INVENTION

A main object of the present invention is to provide a solid center type thread wound golf ball having soft and good shot feel at the time of hitting as good as the liquid center type thread wound golf ball, long flight distance, and large spin amount and good controllability at approach shot when hitting by a short iron club and the like.

According to the present invention, the object described above has been accomplished by employing a solid center composed of an inner center formed from a vulcanized molded rubber composition containing an oily substance, and a center outer layer formed from an oil-resistant substance and coated around the inner center so as to prevent the oily substance of the inner center from bleeding, and adjusting a diameter, hardness and deformation amount when applying from an initial load of 1 kg to a final load of 5 kg of the inner center, a hardness of the center outer layer, and a diameter of the solid center to a specified range, thereby providing a thread wound golf ball having soft and good shot feel at the time of hitting as good as the liquid center type thread wound golf ball, long flight distance, and large spin amount and good controllability at approach shot when hitting by a short iron club and the like.

BRIEF EXPLANATION OF DRAWINGS

The present invention will become more fully understood from the detailed description given hereinbelow and the accompanying drawings which are given by way of illustration only, and thus are not limitative of the present invention, and wherein.

SUMMARY OF THE INVENTION

Figure 1:
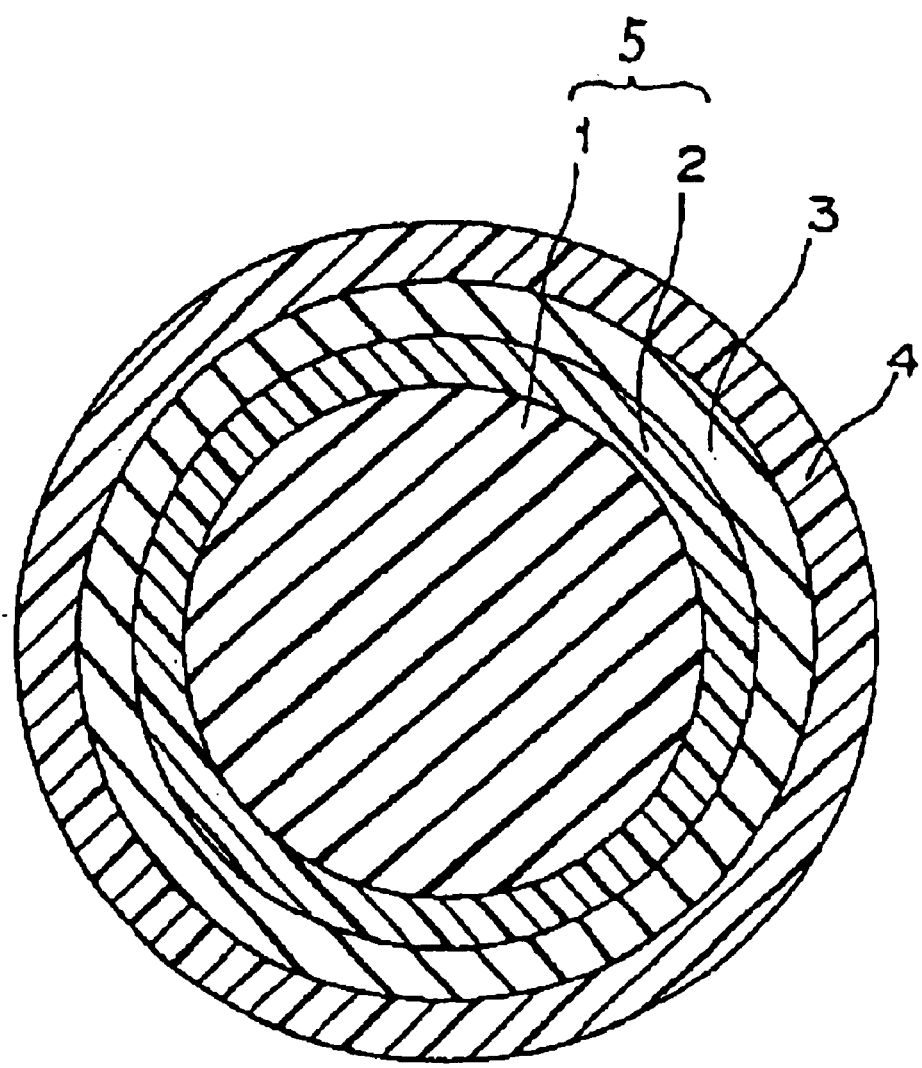
FIG. 1 is a schematic cross section illustrating one embodiment of the golf ball of the present invention.

The present invention provides a thread wound golf ball comprising (a) a solid center composed of an inner center formed from a vulcanized molded rubber composition containing an oily substance, and a center outer layer formed from an oil-resistant substance and coated around the inner center so as to prevent the oily substance of the inner center from bleeding, (b) a thread rubber layer formed on the solid center, and (c) a cover covering the thread rubber layer, wherein the inner center has a diameter of 24 to 33 mm, a JIS-A hardness of not more than 50 and a deformation amount of not less than 2.0 mm when applying from an initial load of 1 kg to a final load of 5 kg, the center outer layer has a Shore D hardness of not more than 60 and is formed from a resin composition mainly containing thermoplastic resin, and the solid center has a diameter of 25 to 34 mm.

DETAILED DESCRIPTION OF THE INVENTION

The thread wound golf ball of the present invention will be explained hereinafter with reference to the accomplishing drawings. FIG. 1 is a schematic cross section illustrating one embodiment of the golf ball of the present invention. As shown in FIG. 1, the golf ball of the present invention comprises a solid center 5 composed of a inner center 1 and a center outer layer 2 formed on the inner center 1, a thread rubber layer 3 formed on the solid center 5, and a cover 4 formed on the thread rubber layer 3. The inner center 1 is formed from a vulcanized molded rubber composition containing an oily substance. A base rubber of the rubber composition used for preparing the inner center of the present invention may be any rubber which can be vulcanized with sulfur or peroxide. For example, polybutadiene rubber (BR), natural rubber (NR), ethylene-propylene-diene monomer terpolymer rubber (EPDM), polynorbornene rubber and the like can be suitably used. It is also possible to use styrene, ethylene and urethane thermoplastic elastomer. In all cases, it is preferable that the rubber has good compatibility with a specified oily substance and can contain the oily substance as much as possible, and has a suitable impact resilience when crosslinked in the state where the oily substance is uniformly dispersed in the rubber.

The oily substance is not limited, but may be one which has fluidity or a semi-solid form at room temperature and has little volatility. Particularly preferred is the oily substance which has good compatibility with the base rubber and causes no deterioration of rebound characteristics of the rubber when being uniformly dispersed in the base rubber, or which can impart a suitable impact resilience to the base rubber having low rebound characteristics by mixing with the base rubber. Examples of the oily substance are as follows.

(1) Petroleum Oil

It is often used as an extending oil for the rubber and is classified as follows according to a content of an aromatic ring, naphthene ring and paraffin chain:

(i) paraffinic oil containing at least 50% of paraffin chain;

(ii) naphthenic oil containing 30 to 45% of naphthene ring carbon; and (iii) aromatic oil containing at least 35% of aromatic carbon (2) Plasticizer Examples thereof include phthalate plasticizer, such as dibutyl phthalate (DBP), dioctyl phthalate (DOP), etc.; adipate plasticizer, such as dioctyl adipate (DOA), etc.; sebacate plasticizer, such as dioctyl sebacate (DOS), etc.; phosphate plasticizer, such as tricresyl phosphate, etc.; and adipic polyester.

(3) Rubber Substitute (Factice)

It is obtained by vulcanizing vegetable oils with sulfur or sulfur chloride, and examples thereof include candy rubber substitute, black rubber substitute, brown rubber substitute and the like.

(4) Alkylbenzene

Examples thereof include 1-dodecyl-4-hexylbemzene, 1-dodecyl-3-hexylbemzene, 1,3,5-methylene, 1,2,3-hemimellitene and the like.

(5) Liquid Rubber

Examples thereof include liquid polybutadiene, liquid polyisoprene and the like.

These oily substances may be used alone or in combination thereof.

It is preferable that the combination of the oily substance with the base rubber is selected by taking the compatibility of the oily substance to the base rubber into consideration. Typical examples of suitable combinations include polybutadiene or natural rubber/naphthene oil or aromatic oil; EPDM/ paraffinic oil; polynorbornene rubber/naphthenic oil, aromatic oil, plasticizer, alkylbenzene or paraffinic oil; urethane rubber/plasticizer or rubber substitute; and the like.

The amount of the oily substance is from 30 to 500 parts by weight, preferably from 50 to 400 parts by weight, based on 100 parts by weight of the base rubber. When the amount of the oily substance is smaller than 30 parts by weight, the technical effects of improving the characteristics of the golf ball of the present invention do not sufficiently exhibit. On the other hand, when the amount of the oily substance is larger than 500 parts by weight, it is often difficult to sufficiently mix the oily substance with the base rubber according to the combination thereof.

The rubber composition for the inner center 1 of the present invention can contain fillers as a specific gravity adjuster (such as barium sulfate, etc.); reinforcer (such as hydrous silicic acid, carbon black, etc.); processing aids as a tackifier; antioxidants and the like, in addition to the base rubber and the oily substance. When the sulfur vulcanization is conducted, sulfur, zinc oxide, stearic acid, vulcanization accelerator, zinc stearate, etc. may be added thereto in a suitable amount as a vulcanization chemical to form a vulcanizable rubber composition. When the peroxide vulcanization is conducted, organic peroxide (such as dicumyl peroxide, 1,1-di-t-butylperoxy-3,3,5-trimethylcyclohexane, etc.); activator (such as zinc stearate, etc.); zinc oxide; co-crosslinking agent (such as zinc acrylate, zinc methacrylate, N,N'-m-phenylenedimaleimide, etc.) may be added thereto in a suitable amount as a vulcanization chemical to form a vulcanizable rubber composition.

The inner center 1 used in the present invention can be made by mixing the above rubber composition, and vulcanizing and press molding the mixture at 150 to 170° C. for 10 to 20 minutes in a mold. The inner center 1 of the golf ball of the present invention has a diameter of 24 to 33 mm, preferably 25 to 32 mm, more preferably 25 to 31 mm. When the diameter of the inner center 1 is smaller than 24 mm, the feature inherent in the inner center, that is, softness is not sufficiently obtained, the spin amount is large, which reduces the flight distance, and the shot feel is poor. On the other hand, when the diameter of the inner center is larger than 33 mm, the center outer layer is too thin, and a desired hardness can not be imparted to of the resultant golf ball.

The inner center 1 has a JIS-A hardness of not more than 50, preferably not more than 45. When the hardness of the inner center is more than 50, the solid center is too hard, the spin amount at the time of hitting is large, which reduces the flight distance, and the shot feel is poor. When the inner center 1 is too soft, it is difficult to mold the center outer layer 2, and it is easy to deform the solid center at the step of winding the thread rubber around the center. Therefore the JIS-A hardness of the inner center 1 is not less than 5, preferably not less than 10, more preferably not less than 15, most preferably not less than 20.

The inner center 1 has a deformation amount of not less than 2.0 mm, preferably not less than 2.2 mm, when applying from an initial load of 1 kg to a final load of 5 kg. When deformation amount of the inner center 1 is less than 2.0 mm, the solid center is too hard, the spin amount at the time of hitting is large, which reduces the flight distance, and the shot feel is poor. When the deformation amount is too large, it is difficult to mold the center outer layer 2, and it is easy to deform the solid center at the step of winding the thread rubber around the center. Therefore the deformation amount of the inner center 1 is not more than 8.0 mm, preferably not more than 7.0 mm. The center outer layer 2 is then formed on the inner center 1.

The center outer layer 2 prevents the oily substance contained in the inner center 1 from bleeding, has a Shore D hardness of not more than 60, preferably not more than 55, and is formed from resin composition mainly comprising thermoplastic resin. When the Shore D hardness of the center outer layer 2 is more than 60, the solid center is too hard, the spin amount at the time of hitting is large, which reduces the flight distance, and the shot feel is poor. When the center outer layer 2 is too soft, the rebound characteristics of the center are degraded. Therefore the center outer layer 2 has a JIS-A hardness of not more than 55, and a Shore D hardness of not less than 10, preferably not less than 15. In the relation between the hardness of the inner center 1 and the center outer layer 2, the hardness of the center outer layer 2 may be large than that of the inner center 1 as long as each hardness is within the above range, but it is preferable that the both hardness in JIS-A hardness can be represented by the following formula:

$$(H_o - H_i) \geq 10$$

wherein $H_o$ is the hardness of the center outer layer, $H_i$ is the hardness of the inner center, thereby compromising the balance of high rebound characteristics and good shot feel.

Examples of the thermoplastic resins, which are not limited to typical thermoplastic resins, such as polystyrene, polyolefin, polyurethane, polyester, polyamide, polyvinyl chloride, fluorine thermoplastic resin, etc. and the mixture thereof, include thermoplastic elastomer that is composed of hard segment and soft segment, and the mixture thereof. Preferred is polyurethane, polyester, polyamide, polyvinyl chloride thermoplastic resin or the mixture thereof, in view of oil resistance, because soft rubber composition containing an oily substance is suitably used for the inner center 1. Particularly referred is polyurethane thermoplastic elastomer, polyester thermoplastic elastomer, polyamide thermoplastic elastomer or the mixture thereof, because it can impart high rebound characteristics and good shot feel to the resulting golf ball.

The resin composition for the center outer layer 2 used in the present invention may optionally contain fillers as a specific gravity adjuster (such as barium sulfate, tungsten, etc.), small amount of ionomer resin for adjusting the hardness of the center outer layer, and the like, in addition to the thermoplastic resin component. The amount of the thermoplastic resin is not less than 50% by weight, preferably not less than 80% by weight, more preferably not less than 90% by weight, based on the total weight of the center outer layer 2.

The center outer layer 2 of the present invention may be formed by conventional methods, which have been known to the art and used for forming the cover of the golf balls. For example, there can be used a method comprising molding the center outer layer composition into a semi-spherical half-shell, covering the inner center with the two half-shells, followed by pressure molding, or a method comprising injection molding the center outer layer composition directly on the inner center to cover it. The center outer layer 2 is formed on the inner center 1 to obtain a solid center 5.

The solid center 5 has a diameter of 25 to 34 mm, preferably 26 to 32 mm. When the diameter is smaller than 25 mm, the spin amount at the time of hitting is large, which reduces the flight distance. On the other hand, when the diameter of the solid center is larger than 34 mm, the thread rubber layer is too thin and the suitable hardness of the resulting golf ball can not be obtained.

The thread rubber layer 3 is then formed on the solid center 5 by winding thread rubber on the solid center to obtain a thread wound center. The thread rubber wound on the solid center 5 can be the same one as that which has been conventionally used in the thread rubber layer of the thread wound golf balls. For example, the thread rubber can be one that is obtained by vulcanizing a rubber composition prepared by formulating sulfur, a vulcanization accelerator, a vulcanization aid, an antioxidant and the like to a natural rubber or a blend rubber of the natural rubber and a synthetic polyisoprene. The thread rubber is wound on the solid center by conventional methods which have used for the thread wound core of the thread wound golf balls. The thread rubber layer may have a thickness of 1.5 to 7.5 mm, preferably 2.0 to 7.0 mm. When the thickness of the thread rubber layer is smaller than 1.5 mm, the thread rubber layer is too thin to exhibit sufficient rebound characteristics of the thread rubber. On the other hand, when the thickness is larger than 7.5 mm, the spin amount is high and the golf ball creates blown-up trajectory, which reduces the flight distance. The cover 4 is then formed on the thread rubber layer 3.

The cover 4 of the present invention may be formed from thermoplastic resin, particularly ionomer resin or mixtures thereof. The ionomer resin may be a copolymer of $\alpha$-olefin and $\alpha,\beta$-unsaturated carboxylic acid having 3 to 8 carbon atoms, of which a portion of carboxylic acid groups is neutralized with metal ion. Examples of the $\alpha$-olefins in the ionomer preferably include ethylene, propylene and the like. Examples of the $\alpha,\beta$-unsaturated carboxylic acid in the ionomer preferably include acrylic acid, methacrylic acid and the like. The metal ion which neutralizes a portion of carboxylic acid groups of the copolymer includes an alkali metal ion, such as a sodium ion, a potassium ion, a lithium ion and the like; a divalent metal ion, such as a zinc ion, a calcium ion, a magnesium ion and the like; a trivalent metal ion, such as an aluminum, a neodymium ion and the like; and mixture thereof. Preferred are sodium ions, zinc ions, lithium ions and the like, in view of rebound characteristics, durability and the like. The ionomer resin is not limited, but examples thereof will be shown by a trade name thereof. Examples of the ionomer resins, which are commercially available from Mitsui Du Pont Polychemical Co., Ltd. include Hi-milan 1555, Hi-milan 1557, Hi-milan 1605, Hi-milan 1652, Hi-milan 1705, Hi-milan 1706, Hi-milan 1707, Hi-milan 1855, Hi-milan 1856 and the like. Examples of the ionomer resins, which are commercially available from Du Pont Co., include Surlyn AD8542, Surlyn 8945, Surlyn 9945 and the like. Examples of the ionomer resins, which are commercially available from Exxon Chemical Co., include Iotek 7010, Iotek 8000 and the like. These ionomer resins may be used alone or in combination.

As the materials used in the cover 4 of the present invention, the above ionomer resin may be used alone, but the ionomer resin may be suitably used in combination with a specific elastomer or resin. Examples of the combinations thereof include:

(i) a heat mixture of an ionomer resin, an acid-modified thermoplastic elastomer or thermoplastic elastomer having terminal OH groups, and an SBS (styrene-butadienestyrene) block copolymer having polybutadiene portion with epoxy groups or SIS (styrene-isoprene-styrene) block copolymer having polyisoprene portion with epoxy groups, (ii) a heat mixture of an ionomer and a terpolymer of ethylene-unsaturated carboxylic acid ester-unsaturated carboxylic acid, and (iii) a heat mixture of an ionomer, a maleic anhydride-modified thermoplastic elastomer and a glycidyl group-modified thermoplastic elastomer. In the cover composition of the present invention, a ratio of the ionomer resin to the specific elastomer or resin (the acid-modified thermoplastic elastomer or thermoplastic elastomer having terminal OH groups, the epoxy group-modified thermoplastic elastomer, the maleic anhydride-modified thermoplastic elastomer and the terpolymer of ethylene-unsaturated carboxylic acid ester-unsaturated carboxylic acid) is preferably 95:5 to 55:45.

Examples of the terminal OH-containing thermoplastic elastomer include hydrogenated styrene-isoprene-styrene (SIS) block copolymers having terminal OH groups, which is commercially available from Kuraray Co., Ltd. under the trade name of "Cepton HG-252" and the like.

Examples of the epoxy group-modified thermoplastic elastomer, which has epoxy groups in elastomer molecule, include styrene-butadiene-styrene (SBS) block copolymers having polybutadiene block with epoxy groups, which are commercially available from Daicel Chemical Industries Co., Ltd. under the trade name of "Epofriend A1010", "Epofriend A1005", "Epofriend A1020" and the like.

Examples of the terpolymer of ethylene-unsaturated carboxylic acid ester-unsaturated carboxylic acid include ethylene-isobutyl acrylate-methacrylic acid terpolymer, which is commercially available from Mitsui Du Pont Polychemical Co., Ltd. under the trade name of "Neucrel AN4212C", "Neucrel N0805J" and the like.

Examples of the maleic anhydride-modified thermoplastic elastomer include maleic anhydride adducts of hydrogenated styrene-butadiene-styrene block copolymers, which are commercially available from Asahi Chemical Industries Co., Ltd. under the trade name of "Taftek M" series; ethylene-ethyl acrylate-maleic anhydride terpolymers, which are commercially available from Sumitomo Chemical Industries Co., Ltd. under the trade name of "Bondine"; and products obtained by graft-modifying ethylene-ethyl acrylate copolymers with maleic anhydride, which are commercially available from Mitsui Du Pont Polychemical Co., Ltd. under the trade name of "AR" series. They are suitably used in the present invention.

Examples of the glycidyl group-modified thermoplastic elastomer include ethylene-glycidyl methacrylate copolymer, ethylene-glycidyl methacrylate-methyl acrylate terpolymer, ethylene-glycidyl methacrylate-vinyl acetate terpolymer, which are commercially available from Sumitomo Chemical Industries Co., Ltd. under the trade name of "Bondfast"; glycidyl methacrylate adducts of hydrogenated styrene-butadiene-styrene (SBS) block copolymers, which are commercially available from Asahi Chemical Industries Co., Ltd. under the trade name of "Taftek Z514", "Taftek Z513" and the like; adducts of ethylene-acrylic ester-glycidyl methacrylate terpolymer, which are commercially available from Du Pont U.S.A. under the trade name of "Elvaloy-AS". Although the glycidyl group is broadly classified into the epoxy group, the term "glycidyl group" herein is used for making clear the difference between epoxy group and glycidyl group. Accordingly, the "glycidyl group" in this specification is different from the "epoxy group".

In case of employing the combination of ionomer resin and the other resin, it is required to heat mixing the both. The heat mixing is typically conducted by mixing for 1 to 20 minutes, and practically conducted in a extruder with controlling temperature.

In the golf ball of the present invention, the cover composition may optionally contain fillers (such as barium sulfate, etc.), pigments (such as titanium dioxide, etc.), and other additives (such as a dispersant, an antioxidant, a UV absorber, a photostabilizer and a fluorescent agent or a fluorescent brightener, etc.), in addition to the resin component, as long as the addition of the additive does not deteriorate the desired performance of the golf ball cover. However, the amount of the pigment is preferably from 1.0 to 6.0 parts by weight based on 100 parts by weight of the cover resin.

The cover of the present invention, i.e. both the inner cover 3 and the outer cover 4, may be formed by conventional methods, which have been known to the art and used for forming the cover of the golf balls. For example, there can be used a method comprising molding the cover composition into a semi-spherical half-shell, covering the thread wound core or the inner cover covering thread wound core with the two half-shells, followed by pressure molding at 130 to 170° C. for 1 to 5 minutes, or a method comprising injection molding the cover composition directly on the thread wound core or the inner cover covering thread wound core to cover it.

It is desired that the cover 4 have a Shore D hardness of 40 to 65, preferably 43 to 63, more preferably 45 to 60. When the Shore D hardness of the cover 4 is lower than 45, the cover is too soft, and the initial velocity is low. On the other hand, when the Shore D hardness of the cover 4 is higher than 65, the cover is too hard, and the spin amount when hit by a short iron club and the like is small. The term "hardness of a cover" refers to the surface hardness in Shore D hardness of the golf ball, which is obtained by covering the thread wound core with the cover.

The cover 4 of the present invention may be formed by conventional methods, which have been known to the art and used for forming the cover of the golf balls. For example, there can be used a method comprising molding the cover composition into a semi-spherical half-shell, covering the thread wound core with the two half-shells, followed by pressure molding at 130 to 170° C. for 1 to 5 minutes, or a method comprising injection molding the cover composition directly on the thread wound core to cover it.

The cover 4 has a thickness of 1.0 to 3.0 mm, preferably 1.2 to 2.5 mm. When the thickness of the cover is smaller than 1.0 mm, the cover is too thin and the cover is easy to break when repeatedly hitting. On the other hand, when the thickness is larger than 3.0 mm, the cover is too thick and the shot feel is poor.

At the time of molding the outer cover, many depressions called "dimples" may be optionally formed on the surface of the golf ball. Furthermore, paint finishing or marking with a stamp may be optionally provided after the cover is molded for commercial purposes.

EXAMPLES

The following Examples and Comparative Examples further illustrate the present invention in detail but are not to be construed to limit the scope of the present invention.

Production of Inner Center

Each spherical inner center was obtained by mixing the rubber composition for the inner center having the formulation shown in Table 1, and press-molding the mixture at 160° C. for 15 minutes. A diameter, a hardness (JIS-A hardness), a deformation amount when applying from an initial load of 1 kg to a final load of 5 kg of the resulting inner center were measured, and the results are shown in Table 4.

TABLE 1

(parts by weight)

| Inner center composition | Example No. | | | | Comparative Example No. | | |
|---|---|---|---|---|---|---|---|
| | 1 | 2 | 3 | 4 | 1 | 2 | 3 |
| Norsorex *1 | 100 | 100 | 100 | 100 | — | 100 | 100 |
| Alkyl benzene oil *2 | 150 | 200 | 200 | 300 | — | 200 | 200 |
| BR11 *3 | — | — | — | — | 100 | — | — |
| Zinc oxide | 5 | 5 | 5 | 5 | 5 | 5 | 5 |
| Stearic acid | 1 | 1 | 1 | 1 | 2 | 1 | 1 |
| Barium sulfate | 220 | 270 | 410 | 370 | 75 | 270 | 330 |
| Sulfur | 1.5 | 1.5 | 1.5 | 1.5 | 10 | 1.5 | 1.5 |
| Nocceler CZ *4 | — | — | — | — | 1.5 | — | — |
| Nocceler TT *5 | 1 | 1 | 1 | 1 | 0.2 | 1 | 1 |
| Nocceler DM *6 | 1 | 1 | 1 | 1 | — | 1 | 1 |
| Nocceler TBT-N *7 | 1.5 | 1.5 | 1.5 | 1.5 | — | 1.5 | 1.5 |
| Nocceler TTTE *8 | 0.5 | 0.5 | 0.5 | 0.5 | — | 0.5 | 0.5 |

*1: Polynorbornene rubber (trade name "Norsorex") from Nippon Zeon Co., Ltd.
*2: Alkyl benzene oil from Nippon Zeon Co., Ltd.
*3: High-cis polybutadiene (trade name "BR11") from JSR Co., Ltd., Content of 1,4-cis-polybutadiene: 96%
*4: Vulcanization accelerator (trade name "Nocceler CZ") N-cyclohexyl-2-benzothiazyl sulfenamide from Ouchi Shinko Chemical Industries Co., Ltd.
*5: Vulcanization accelerator (trade name "Nocceler TT") tetramethyl thiuram disulfide from Ouchi Shinko Chemical Industries Co., Ltd.
*6: Vulcanization accelerator (trade name "Nocceler DM") dibezothiazyl disulfide from Ouchi Shinko Chemical Industries Co., Ltd.
*7: Vulcanization accelerator (trade name "Nocceler TBT-N") tetrabutyl thiuram disulfide from Ouchi Shinko Chemical Industries Co., Ltd.
*8: Vulcanization accelerator (trade name "Nocceler TTTE") tellurium diethyldithiocarbamate from Ouchi Shinko Chemical Industries Co., Ltd.

Production of Solid Center

Each solid center was obtained by injection molding the rubber composition for the center outer layer having the formulation shown in Table 2 directly on the inner center. A diameter of the resulting solid center was measured, and the results are shown in Table 3. A Shore D hardness of the resin component for the outer layer center was measured, and the results are shown in Table 2.

TABLE 2

(parts by weight)

| Center outer layer composition | Example No. | | | | Comparative Example No. | | |
|---|---|---|---|---|---|---|---|
| | 1 | 2 | 3 | 4 | 1 | 2 | 3 |
| Hytrel 4767 *9 | — | — | — | 100 | — | — | — |
| Kuramilon 8170 *10 | 100 | — | — | — | 100 | — | — |
| Elastoran ET880 *11 | — | 100 | — | — | — | — | — |
| Pebax 5523 *12 | — | — | 100 | — | — | — | — |
| N230S *13 | — | — | — | — | — | 100 | — |
| Zinc oxide | — | — | — | — | — | 5 | — |
| Stearic acid | — | — | — | — | — | 1.5 | — |
| FEF black | — | — | — | — | — | 20 | — |
| FT black | — | — | — | — | — | 30 | — |
| DOP | — | — | — | — | — | 10 | — |
| Nocrac ODA *14 | — | — | — | — | — | 1.5 | — |
| Nocceler CZ *4 | — | — | — | — | — | 1.5 | — |
| Sulfur | — | — | — | — | — | 0.3 | — |
| Hi-milan 1605 *15 | — | — | — | — | — | — | 50 |
| Hi-milan 1706 *16 | — | — | — | — | — | — | 50 |

*9: Polyester thermoplastic elastomer (trade name "Hytrel 4767") available from Toray-Do Pont Co., Ltd.
*10: Polyurethane thermoplastic elastomer (trade name "Kuramilon 8170") available from Kuraray Co., Ltd.
*11: Polyurethane thermoplastic elastomer (trade name "Elastoran ET880") available from Takeda Verdishe Urethane Industries, Ltd.
*12: Polyamide thermoplastic elastomer (trade name "Pebax 25330), which are commercially available from Atochem Co. (Toray)
*13: Acrylonitrile-butadiene rubber (NBR) (trade name "N230S") from JSR Co., Ltd.
*14: Antioxidant (trade name "Nocrac ODA") alkylated diphenylamine from Ouchi Shinko Chemical Industries Ltd.
*15: Hi-milan 1605 (trade name), ethylene-methacrylic acid copolymer ionomer resin obtained by neutralizing with sodium ion, manufactured by Mitsui Du Pont Polychemical Co., Ltd.
*16: Hi-milan 1706 (trade name), ethylene-methacrylic acid copolymer ionomer resin obtained by neutralizing with zinc ion, manufactured by Mitsui Du Pont Polychemical Co., Ltd.

Formation of Thread Rubber Layer

Each thread rubber layer was then formed on the solid center by winding the thread rubber. The thread rubber was prepared from a blend of natural rubber and a low cis-isoprene rubber ("Shell IR-309" commercially available from Shell Chemical Co., Ltd.)=50/50 (weight ratio). A diameter after winding the thread rubber was about 39.9 mm.

Preparation of Cover Composition

The formulation materials shown in Table 3 were mixed using a kneading type twin-screw extruder to obtain pelletized cover compositions. The extrusion condition were
  a screw diameter of 45 mm,
  a screw speed of 200 rpm, and
  a screw L/D of 35.
The formulation materials were heated at 200 to 260° C. at the die position of the extruder.

TABLE 3

(parts by weight)

| Cover composition | Amount (parts by weight) |
|---|---|
| Surlyn 9945 *17 | 25 |
| Surlyn 8945 *18 | 25 |
| Epofriend A1010 *19 | 15 |
| Cepton HG-252 *20 | 35 |
| Titanium dioxide | 2 |
| Barium sulfate | 2 |

*17: Surlyn 9945 (trade name), ethylene-methacrylic acid copolymer ionomer resin obtained by neutralizing with zinc ion, manufactured by Du Pont Co.
*18: Surlyn 8945 (trade name), ethylene-methacrylic acid copolymer ionomer resin obtained by neutralizing with sodium ion, manufactured by Du Pont Co.
*19: Epofriend A1010 (trade name), styrene-butadiene-styrene structure block copolymer having a polybutadiene block with epoxy groups, manufactured by Daicel Chemical Industries, Ltd.
*20: Cepton HG-252 (trade name), hydrogenated styrene-isoprene/butadiene-styrene block copolymer having a terminal OH group, manufactured by Kuraray Co. Ltd.

Examples 1 to 4 and Comparative Examples 1 to 3

The resulting cover compositions were preliminary molded into semi-spherical half-shells, encapsuling the resulting thread wound core with the two half-shells, followed by press-molding in the mold for golf ball and then coating with a paint to obtain a thread wound golf ball having an outer diameter of 42.8 mm. Cover hardness (surface hardness in Shore D hardness), flight performance (initial velocity, launch angle, spin amount and carry) and shot feel were measured or evaluated, and the results are shown in Table 4. The test methods are as follows.

Test Method (1) Flight Performance 1

After a No. 1 wood club (a driver, W#1) was mounted to a swing robot manufactured by True Temper Co. and a golf ball was hit at head speed of 45 m/sec, the initial velocity, launch angle, spin amount and flight distance were measured. The spin amount was measured by continuously taking a photograph of a mark provided on the hit golf ball using a high-speed camera. As the flight distance, carry which is a distance to the dropping point of the hit golf ball was measured.

(2) Flight Performance 2

After a No. 9 iron club (I#9) was mounted to a swing robot manufactured by True Temper Co. and a golf ball was hit at head speed of 34 m/sec, spin amount was measured.

(3) Shot Feel

The shot feel of the golf ball is evaluated by 10 top professional golfers according to a practical hitting test using a No. 1 wood club. The evaluation criteria are as follows.

Evaluation Criteria:

○: Not less than 8 out of 10 golfers felt that the golf ball has soft and good shot feel.

X: Not less than 8 out of 10 golfers felt that the golf ball has hard and poor shot feel.

Test Results

TABLE 4

| Test Item | Example No. | | | | Comparative Example No. | | |
|---|---|---|---|---|---|---|---|
| | 1 | 2 | 3 | 4 | 1 | 2 | 3 |
| Inner center | | | | | | | |
| Diameter (mm) | 29.5 | 27.5 | 25.5 | 27.5 | 27.5 | 27.5 | 27.5 |
| Hardness (JIS-A) | 40 | 30 | 30 | 20 | 75 | 30 | 30 |
| Deformation amount (mm) | 2.9 | 4.1 | 4.0 | 5.5 | 1.2 | 4.1 | 4.1 |
| Center outer layer | | | | | | | |
| Hardness (Shore D) | 15 | 25 | 55 | 47 | 15 | 15 | 63 |
| Solid center | | | | | | | |
| Diameter | 33.5 | 31.5 | 29.5 | 31.5 | 31.5 | 31.5 | 31.5 |
| Golf ball | | | | | | | |
| Flight performance 1 (W#1, 45 m/sec) | | | | | | | |
| Initial velocity (m/sec) | 64.7 | 64.8 | 64.9 | 64.9 | 64.9 | 63.9 | 64.8 |
| launch angle (degree) | 11.3 | 11.1 | 11.0 | 11.2 | 10.1 | 11.0 | 10.3 |
| Spin amount (rpm) | 2850 | 2880 | 2970 | 2830 | 3340 | 2830 | 3250 |
| Carry (yard) | 222.5 | 223.5 | 223.1 | 222.8 | 218.5 | 215.0 | 219.5 |

TABLE 4-continued

| Test Item | Example No. | | | | Comparative Example No. | | |
|---|---|---|---|---|---|---|---|
| | 1 | 2 | 3 | 4 | 1 | 2 | 3 |
| Flight performance 2 (I#9, 34 m/sec) | | | | | | | |
| Spin amount (rpm) | 8600 | 8720 | 8750 | 8650 | 8830 | 8580 | 8680 |
| Shot feel | ○ | ○ | ○ | ○ | x | ○ | x |

As is apparent from Table 4, the golf balls of Examples 1 to 4 had longer flight distance than the conventional thread wound golf balls of Comparative Examples 1 to 3, and had soft and good shot feel which evaluated by top professional golfers.

On the other hand, in the golf ball of Comparative Example 1, since the hardness of the inner center is too high, the spin amount is high and the golf ball creates blown-up trajectory when hit by a driver, which reduces the flight distance, and the shot feel is hard and poor.

In the golf ball of Comparative Example 2, the initial velocity is low and thus the flight distance is short, because the center outer layer is formed from NBR.

In the golf ball of Comparative Example 3, since the center outer layer is formed from ionomer resin, the hardness of the center outer layer is too high, and thus the spin amount is high and the golf ball creates blown-up trajectory when hit by a driver, which reduces the flight distance, and the shot feel is hard and poor.

What is claimed is:

1. A thread wound golf ball comprising (a) a solid center composed of an inner center formed from a vulcanized molded rubber composition containing an oily substance, and a center outer layer formed from an oil-resistant thermoplastic elastomer selected from the group consisting of polyurethane thermoplastic elastomer, polyester thermoplastic elastomer, polyamide thermoplastic elastomer and a mixture thereof that is composed of hard segment and soft segment, and coated around the inner center so as to prevent the oily substance of the inner center from bleeding, (b) a thread rubber layer formed on the solid center, and (c) a cover covering the thread rubber layer, wherein the inner center has a diameter of 24 to 33 mm, a JIS-A hardness of not more than 50 and a deformation amount of not less than 2.0 mm when applying from an initial load of 1 kg to a final load of 5 kg, the center outer layer has a Shore D hardness of not more than 60, and the solid center has a diameter of 25 to 34 mm.

2. The thread wound golf ball according to claim 1, wherein the cover has a Shore D hardness of 40 to 65.

3. The thread wound golf ball according to claim 1, wherein the thermoplastic elastomer is presented in amount of not less than 50% by weight, based on the total weight of the center outer layer.

4. The thread wound golf ball according to claim 1, wherein the cover has a thickness of 1.0 to 3.0 mm.

* * * * *